(12) United States Patent
Stengel

(10) Patent No.: US 7,704,020 B1
(45) Date of Patent: Apr. 27, 2010

(54) CORE DRILLING MACHINE

(75) Inventor: James M. Stengel, Marion, IN (US)

(73) Assignee: Marion Engineering & Technology, Inc., Marion, IN (US)

( * ) Notice: Subject to any disclaimer, the term of this patent is extended or adjusted under 35 U.S.C. 154(b) by 309 days.

(21) Appl. No.: 11/860,041

(22) Filed: Sep. 24, 2007

Related U.S. Application Data

(60) Provisional application No. 60/868,587, filed on Dec. 5, 2006.

(51) Int. Cl.
*B23B 39/20* (2006.01)

(52) U.S. Cl. .......................... 408/35; 408/36

(58) Field of Classification Search .............. 29/40, 29/565; 408/35–37, 40, 42, 89, 234, 236; *B23B 39/16, B23B 39/18, 39/20, 39/22, 39/24*
See application file for complete search history.

(56) References Cited

U.S. PATENT DOCUMENTS

| | | | | |
|---|---|---|---|---|
| 169,679 | A * | 11/1875 | Dam | 408/36 |
| 289,817 | A * | 12/1883 | Drummond et al | 408/36 |
| 451,594 | A * | 5/1891 | Jewell | 408/36 |
| 568,320 | A * | 9/1896 | Poertner | 408/36 |
| 705,658 | A | 7/1902 | Edwards et al. | |
| 787,685 | A | 4/1905 | Ludlow | |
| 900,109 | A | 10/1908 | Marsellis | |
| 1,607,614 | A * | 11/1926 | Graham | 408/9 |
| 1,630,528 | A | 5/1927 | Doyle | |
| 2,343,603 | A | 3/1944 | Whiting, Jr. | |
| 2,709,932 | A | 6/1955 | Grimes | |
| 2,934,978 | A * | 5/1960 | Estabrook | 408/13 |
| 3,286,595 | A * | 11/1966 | Wollenhaupt | 483/32 |
| 3,292,235 | A * | 12/1966 | Riedel | 483/54 |
| 3,546,774 | A * | 12/1970 | Holzl et al. | 483/48 |
| 3,967,687 | A | 7/1976 | Fowler | |
| 4,009,545 | A | 3/1977 | Rossborough | |
| 4,051,583 | A * | 10/1977 | Kato et al. | 29/40 |
| 4,121,332 | A * | 10/1978 | Corsi | 483/46 |
| 4,216,572 | A * | 8/1980 | Matsushita et al. | 483/32 |
| 4,222,687 | A | 9/1980 | Williams | |

(Continued)

FOREIGN PATENT DOCUMENTS

JP     63196344 A * 8/1988

(Continued)

*Primary Examiner*—Daniel W Howell
(74) *Attorney, Agent, or Firm*—Baker & Daniels LLP

(57) ABSTRACT

A drilling assembly for drilling holes in concrete structures. The assembly includes a base assembly defining a longitudinal axis and adapted to support at least two concrete structures, for example, on turntables positioned in spaced apart relation along the longitudinal axis. A drilling machine is movably mounted to the base assembly between the turntables for movement along the longitudinal axis, and includes a drill assembly having first and second drill bits each substantially aligned along the longitudinal axis and facing substantially opposite directions. In this manner, the drilling machine includes an in-line, dual drill bit assembly which allows the machine to move along a single horizontal axis for both drilling operations and for traversing between the turntables. Advantageously, the present assembly combines the traverse and drilling axes of the drilling machine into a single horizontal axis, thus eliminating the need to traverse the machine between a pair of turntables along a first horizontal axis and to perform drilling operations along a second horizontal axis.

16 Claims, 8 Drawing Sheets

U.S. PATENT DOCUMENTS

| | | |
|---|---|---|
| 4,430,912 A | 2/1984 | Gundy |
| 4,622,734 A * | 11/1986 | Kolblin et al. ................. 483/32 |
| 4,656,726 A * | 4/1987 | Suzuki et al. ................. 483/54 |
| 4,694,871 A * | 9/1987 | Jenkner ..................... 144/35.1 |
| 4,742,609 A * | 5/1988 | Neumann ....................... 483/3 |
| 5,004,381 A * | 4/1991 | Jenkner ........................ 408/31 |
| 5,020,945 A * | 6/1991 | Becker ........................ 408/1 R |
| 5,494,088 A * | 2/1996 | Susnjara ................... 144/93.1 |
| 5,595,524 A | 1/1997 | Gundy |
| 6,183,172 B1 * | 2/2001 | Shoda ........................ 408/36 |

FOREIGN PATENT DOCUMENTS

| | | | |
|---|---|---|---|
| JP | 02205455 A | * | 8/1990 |
| JP | 02232109 A | * | 9/1990 |
| JP | 10080904 A | * | 3/1998 |

\* cited by examiner

FIG._6

CORE DRILLING MACHINE

CROSS-REFERENCE TO RELATED APPLICATIONS

This application claims the benefit under Title, 35 U.S.C. §119(e) of U.S. Provisional Patent Application Ser. No. 60/868,587, entitled CORE DRILLING MACHINE, filed on Dec. 5, 2006, the disclosure of which is expressly incorporated by reference herein.

BACKGROUND OF THE INVENTION

1. Field of the Invention

The present invention relates to a core drilling machine for drilling holes in concrete structures such as manhole risers, for example, to allow pipes to be attached to the concrete structures.

2. Description of the Related Art

Concrete structures are often used in municipal water and sewer systems and in other groundwater systems, for example, as manhole risers to which underground pipes are connected. Typically, the concrete structures are cast in the form of concrete boxes or concrete cylinders having a square or round wall, a floor, and an open upper end. After the concrete structure is cast, one or more circular holes are drilled in the wall or walls of the concrete structure to provide an interface to which an underground pipe may be attached via a sealing assembly. Typically, the sealing assembly includes an annular gasket, an expansion band mechanism for sealing the gasket within the hole in the wall of the concrete structure, and an external clamping band for sealing the annular gasket to the outer surface of the pipe.

One known machine assembly 10 for drilling holes in concrete structures is shown in FIG. 1, and includes a drilling machine 12 generally including frame 14, a drive unit 16, such as an electric or hydraulic motor, and a single drill bit 18 rotatably driven by the drive unit 16. The machine 12 is typically fixed to the floor of a building adjacent a turntable 20 upon which a concrete structure CS is supported. The machine 12 includes a drill bit translation device, such as a hydraulic cylinder 22, to move the drill bit 18 toward and away from the concrete structure to drill a hole in a wall of the concrete structure. The turntable 20 may be rotated to align different portions of the wall or walls of the concrete structure with the drill bit 18 in order for the machine 12 to drill multiple holes in the concrete structure. Also, the height of drill bit 18 is vertically adjustable with respect to frame 14 of the machine 12 to vary the vertical location at which holes are drilled in the concrete structure. After a desired number of holes are drilled in the concrete structure, the concrete structure is moved off of the turntable 20, such as by a crane, and another concrete structure is moved on to the turntable to drill holes therein.

Thus, the operation of the assembly 10 involves three separate movement axes, including a horizontal drilling axis and a vertical adjustment axis associated with machine 12, and a vertical rotational axis associated with turntable 20.

Although the assembly shown in FIG. 1 has proven to be effective, the need to adjust the rotational position of the turntable and/or the vertical height of the drill bit between each drilling operation, as well as the movement of the concrete structures onto and off of the turntable, can be time consuming and laborious.

Another machine assembly 24 for drilling holes in concrete structures is shown in FIG. 2, in which the machine 12 of FIG. 1 or a similar machine is disposed adjacent a pair of turntables 20a and 20b which are positioned side-by-side. The machine 12 is mounted on a set of tracks 26 adjacent the turntables 20a and 20b and is movable along the tracks 26 to traverse along a horizontal axis between positions in which the machine 12 is aligned with a respective turntable 20a or 20b. The operation of the drilling machine 12 is otherwise identical or similar to that described above.

Thus, the operation of assembly 24 involves five movement axes, including a horizontal traverse axis, a horizontal drilling axis, and a vertical adjustment axis associated with machine 12, as well as a pair of vertical rotational axes associated with turntables 20a and 20b, respectively.

Assembly 24 represents an improvement over assembly 10 described above in that the drilling machine 10 of assembly 24 may drill holes in a first concrete structure CS mounted to a first turntable 20a while a second concrete structure CS is moved onto or off of the second turntable 20b. Thereafter, the machine 12 traverses along tracks 26 and the horizontal traverse axis from the first turntable 20a to the second turntable 20b and then performs drilling operations with respect to the concrete structure CS on the second turntable 20b while the concrete structure CS on the first turntable 20a is removed and replaced with another concrete structure.

Although the assembly shown in FIG. 2 alleviates the need to entirely stop the operation of the machine while concrete structures are moved onto or off of a given turntable, the need to adjust the rotational position of a turntable and/or the vertical height of the drill bit between each drilling operation, as well as the traversing movement of machine 12 along tracks 26, may be time consuming and laborious. Also, the tracks 26 of the assembly 24 are mounted along, and cover, a relatively large area of the building floor on the side of the first and second turntables 20a and 20b on which machine is disposed. Further, the machine must be anchored securely in place prior to drilling to reduce vibrations and prevent the rotational torque of the drill bit from interfering with the lateral position of the drilling machine.

What is needed is a drilling machine assembly for concrete structures which is an improvement over the foregoing.

SUMMARY OF THE INVENTION

The present invention provides a drilling assembly for drilling holes in concrete structures. The assembly includes a base assembly defining a longitudinal axis and adapted to support at least two concrete structures, for example, on turntables positioned in spaced apart relation along the longitudinal axis. A drilling machine is movably mounted to the base assembly between the turntables for movement along the longitudinal axis, and includes a drill assembly having first and second drill bits each substantially aligned along the longitudinal axis and facing substantially opposite directions. In this manner, the drilling machine includes an in-line, dual drill bit assembly which allows the machine to move along a single horizontal axis for both drilling operations and for traversing between the turntables. Advantageously, the present assembly combines the traverse and drilling axes of the drilling machine into a single horizontal axis, thus eliminating the need to traverse the machine between a pair of turntables along a first horizontal axis and to perform drilling operations along a second horizontal axis.

In one embodiment, the assembly includes a base assembly having a track disposed along its longitudinal axis, and a pair of turntables disposed on opposite ends of the track. The drilling machine includes a frame mounted on the track for traversing movement therealong between the turntables, the frame supporting the drive unit and the drill assembly. The drill assembly is vertically adjustable with respect to the frame to vary the height of the drill bits. In operation, the drilling machine moves along a horizontal drill axis to drill holes in a first concrete structure mounted to the first turntable, and thereafter may traverse along the same axis using the same movement mechanism to move from the first turntable toward the second turntable to perform drilling operations on a second concrete structure supported by the second turntable.

Advantageously, the present assembly combines the drilling axis of the machine with the traverse axis of the machine and performs both drilling and traversing operations using the same movement mechanism to facilitate higher productivity. Additionally, the track of the base assembly is disposed between the turntables such that a minimum of floor space is required to operate the machine, allowing personnel to move about the machine and the turntables as necessary without being impeded by the tracks of the base assembly.

In one form thereof, the present invention provides a drilling assembly for drilling holes in concrete structures, the drilling assembly including a base assembly defining a longitudinal axis and adapted to support at least two concrete structures; and a drilling machine mounted with respect to the base assembly for movement along the longitudinal axis, the drilling machine including a frame; a drive unit; and a drill assembly driven by the drive unit, the drill assembly including first and second drill bits each substantially aligned along the axis and facing in substantially opposite directions.

In another form thereof, the present invention provides a drilling assembly for drilling holes in concrete structures, the drilling assembly including a base assembly, including first and second concrete structure supports spaced from one another and disposed along a longitudinal axis; and a track disposed between the first and second concrete structure supports and aligned along the longitudinal axis; and a drilling machine movable along the track, the drilling machine including a frame; and dual in-line drill bit means for alternately traversing and drilling in opposite directions along the longitudinal axis.

In another form thereof, the present invention provides a drilling assembly for drilling holes in concrete structures, the drilling assembly including a base assembly defining a longitudinal axis and adapted to support at least two concrete structures; and a drilling machine mounted with respect to the base assembly for movement along the longitudinal axis, the drilling machine including a frame; a drive unit and at least one drill bit rotatably driven by the drive unit; and a rotatable turret assembly upon which the drive unit is mounted, the turret assembly rotatable with respect to the frame to move the drill bit between a first position in which the drill bit is aligned along the longitudinal axis facing in a first direction and a second position in which the drill bit is aligned along the longitudinal axis facing in a second direction opposite the first direction.

In a further form thereof, the present invention provides a method of drilling holes in concrete structures, including the steps of drilling a hole in a first concrete structure by moving a drill bit of a drill assembly toward and away from the first concrete structure along a first axis; and drilling a hole in a second concrete structure positioned on a side of said drill assembly opposite said first concrete structure by moving a drill bit of the drill assembly toward and away from the second concrete structure along the first axis.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention any manner.

DETAILED DESCRIPTION

Figure 3:
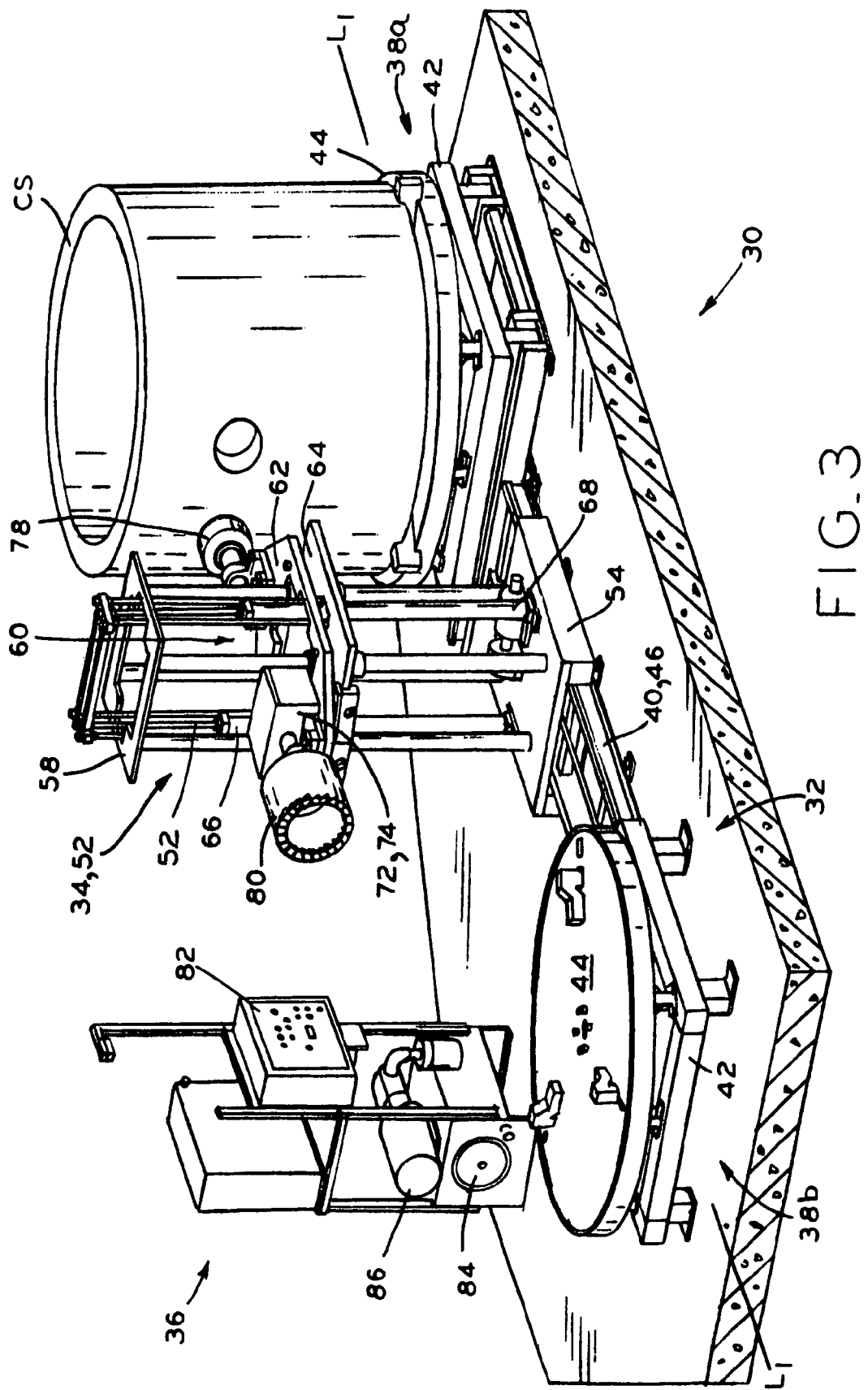
FIG. 3 is a first perspective view of a drilling assembly according to a first embodiment of the present invention.
Figure 4:
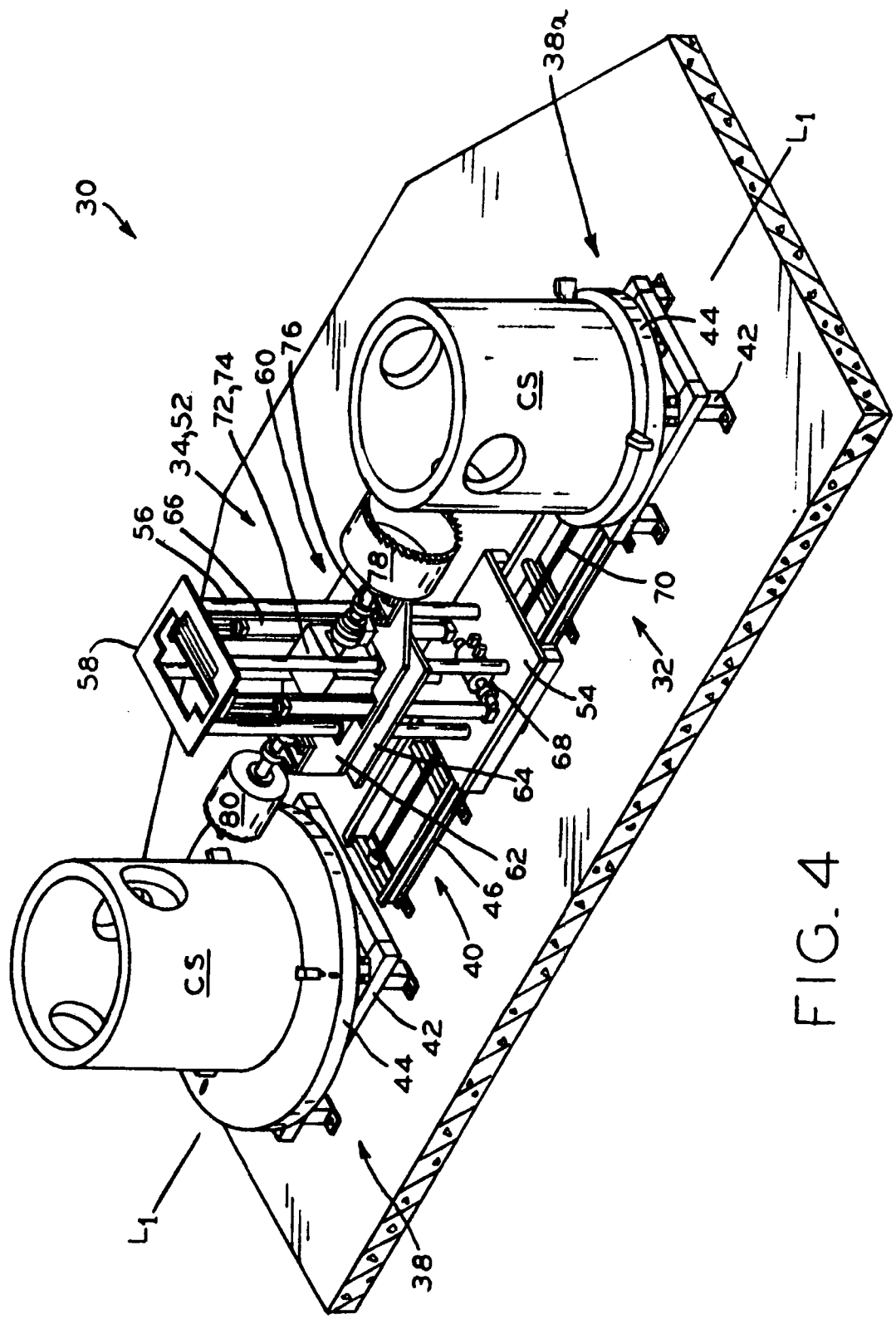
FIG. 4 is a second perspective view of the drilling assembly, showing the drilling machine disposed in an intermediate position in between the turntables of the base assembly.
Figure 5:
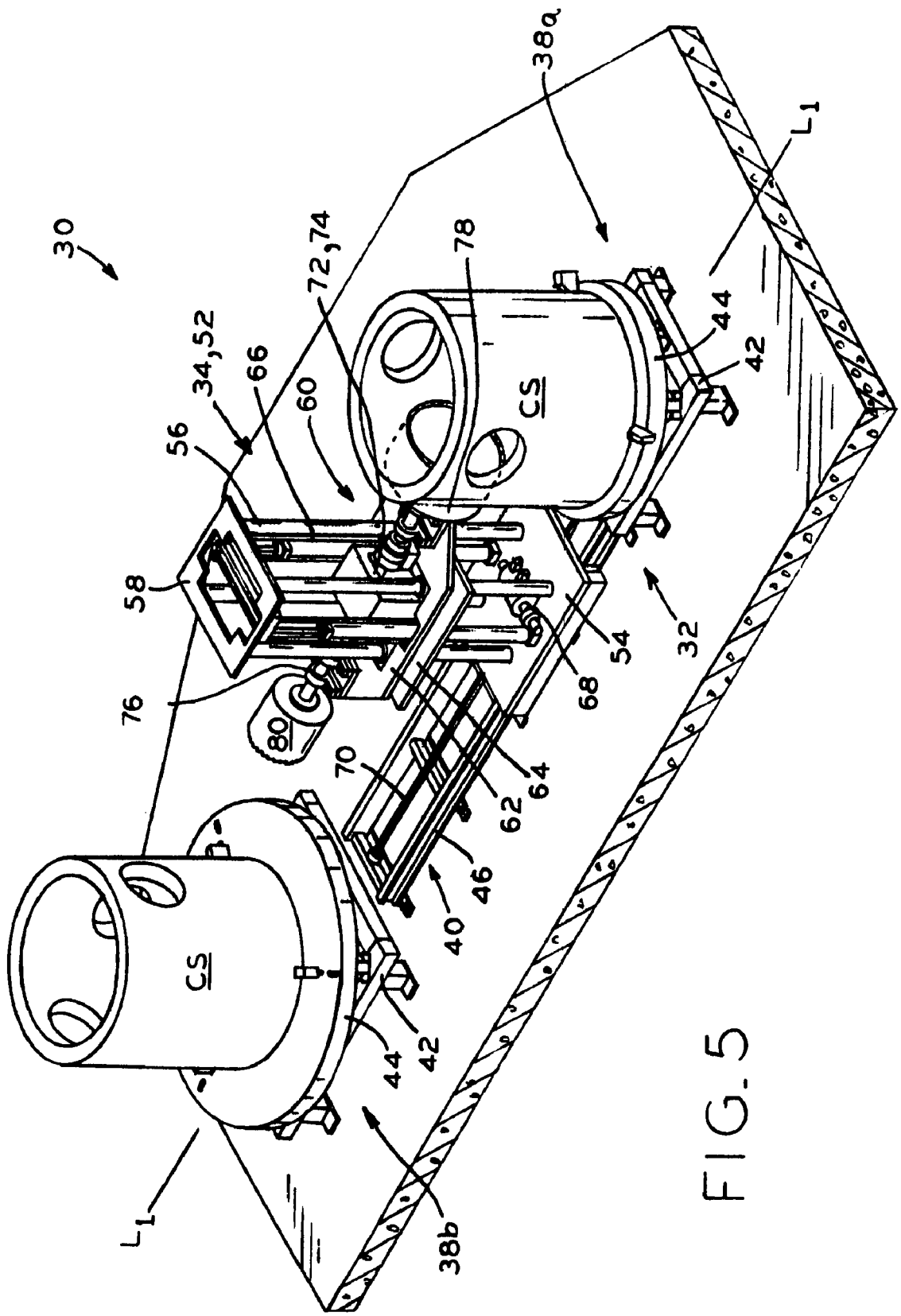
FIG. 5 is a third perspective view of the drilling assembly, showing the drilling machine performing drilling operations on a first concrete structure disposed on a first turntable assembly.
Figure 6:
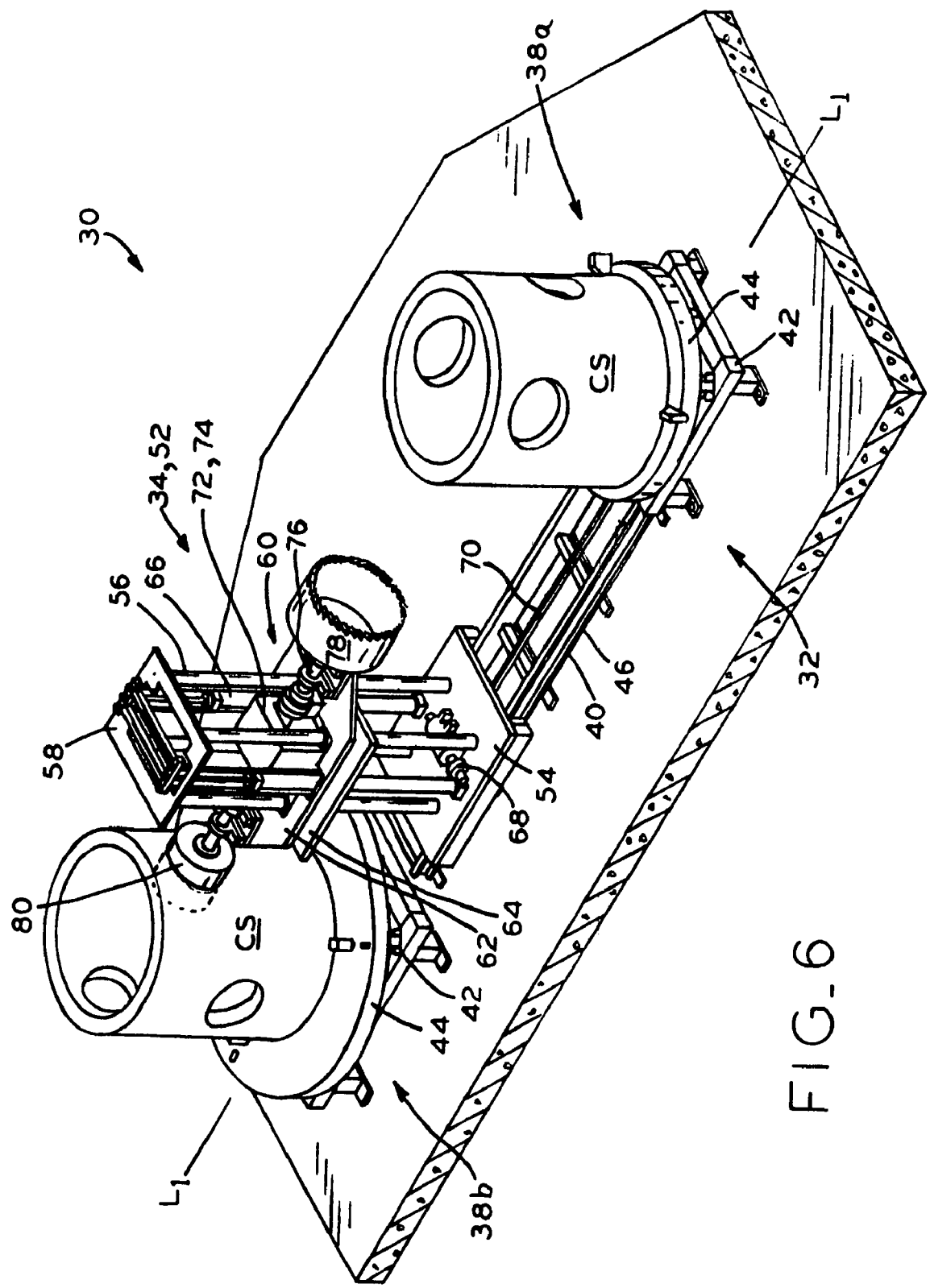
FIG. 6 is a fourth perspective view of the drilling assembly, showing the drilling machine performing drilling operations on a second concrete structure disposed on a second turntable assembly.

Referring to FIGS. 3-6, a drilling assembly 30 in accordance with an exemplary embodiment of the present invention is shown. Drilling assembly 30 generally includes base assembly 32 for supporting concrete structures CS, a drilling machine 34 which is movable along base assembly 32 as described below, and control unit 36 (FIG. 3).

Base assembly 32 generally includes a pair of first and second turntable assemblies 38a and 38b and a track 40 disposed between the turntable assemblies 38a and 38b, with the turntable assemblies 38a and 38b and track 40 disposed along a longitudinal axis $L_1$-$L_1$ of the drilling assembly 30. Each turntable assembly 38a and 38b generally includes a base frame 42 which may be secured to the floor of a building, and a turntable 44 rotatably supported on base frame 42 in a suitable manner. A concrete structure CS may be supported on each turntable assembly 38a and 38b for performing drilling operations with respect to the concrete structure, and the concrete structure may be rotated on each turntable assembly 38a and 38b for drilling one or more holes in the walls of the concrete structure in the manner described below. Track 40 generally includes a pair of rails 46 which may be secured to the floor of a building. Drilling machine 34 is movable along rails 46 for drilling and traversing movement along the longitudinal axis $L_1$-$L_1$ of the drilling assembly 30 in the manner described below.

Drilling machine 34 generally includes a frame 52 including base frame 54, a plurality of vertical supports 56, and upper frame 58. A turret assembly 60 includes upper and lower plates 62 and 64, and is slidably mounted to vertical supports 56 of frame 52 for vertical movement therealong. A pair of hydraulic cylinders 66 are mounted between base frame 54 and upper frame 58 and are connected to turret assembly 60. Hydraulic cylinders 66 support the weight of turret assembly 60 with respect to vertical supports 56, and the position of turret assembly 60 is vertically adjustable along vertical supports 56 by pneumatic cylinders 66 in the manner described below.

Base frame 54 includes a frame drive unit 68, such as an electrical or hydraulic motor, for example. In one embodiment, frame drive unit 68 drives a belt and cog assembly (not shown) for moving frame 52 of drilling machine 34 along rails 46 of track 40 by engaging an endless toothed belt 70 mounted with respect to track 40, with base frame 54 including suitable rollers or wheels (not shown) movable along rails 46 of track 40. Other drive assemblies by which drilling machine 34 may be moved along rails 46 of track 40 for drilling and traversing movements between turntable assemblies 38a and 38b, such as belt drive, friction wheel drive, cable drive, or gear drive assemblies, may be apparent to one of ordinary skill in the art.

Drill assembly 72 is mounted on upper plate 62 of turret assembly 60, and generally includes a drive unit 74 which drives a common shaft or spindle 76 aligned with longitudinal axis $L_1$-$L_1$. Shaft 76 includes opposite first and second ends to which first and second drill bits 78 and 80 are respectively secured. Drill bits 78 and 80 are cylindrically shaped for drilling round holes in concrete structures, and may be of various diameter sizes. Alternatively, drive unit 74 may separately drive drill bits 78 and 80 via separate shafts. In one embodiment, drive unit 74 includes a hydraulic motor and a multiple-speed transmission for varying the speed/torque at which shaft 76 and drill bits 78 and 80 are driven.

Control unit 36 (FIG. 3) may be positioned at a location that is spaced from base assembly 32 and drilling machine 34, and includes a user-operable control interface 82 for controlling the operation of turntable assemblies 38a and 38b and drilling machine 34. In the present embodiment, control unit 36 also includes a hydraulic reservoir 84 and hydraulic pump 86. Hydraulic pump 86 is in fluid communication with the hydraulic motor of drive unit 74 of drill assembly 72 via suitable conduits (not shown), and is also in fluid communication with other hydraulic motors (not shown) associated with turntable assemblies 38a and 28b via additional conduits (not shown). The hydraulic motors of turntable assemblies 38a and 38b may be hydraulically driven to rotate turntables 44, such as by driving a pneumatic tire (not shown) which engages the underside of each turntable 44 to rotate same. The hydraulic motors associated with turntable assemblies 38a and 38b may be selectively controlled to rotate turntables 44 along known angular intervals.

Drilling assembly 30 may operate in one embodiment as follows. First, pre-cast concrete structures CS are mounted on turntable assemblies 38a and 38b for drilling one or more holes in each of the concrete structures. Drilling machine 34 is moved from a "home" position shown in FIGS. 3 and 4 in which same is spaced between turntable assemblies 38a and 38b, for example, to provide sufficient clearance around turntables 44 for concrete structures to be loaded onto turntables 44. Thereafter, drilling machine 34 is traversed along track 40 by frame drive unit 68 as described above to place a selected drill bit 78 or 80 of drill assembly 72 proximate the concrete structure. As necessary, hydraulic cylinders 66 of frame 52 may be actuated to adjust the vertical positioning of turret assembly 66 with respect to vertical supports 56 of frame 52 and hence, the vertical position of shaft 76 and drill bits 78 and 80 to a desired vertical position relative to the concrete structure. Thereafter, hydraulic pump 86 and the hydraulic motor of drive unit 74 of drill assembly 72 are actuated to rotate shaft 76 and drill bits 78 and 80 and concurrently, frame drive unit 68 is actuated to move drilling machine 34 along track 40 and longitudinal axis $L_1$-$L_1$ to engage drill bits 78 with a first concrete structure CS for drilling a hole therein. After drill bit 78 penetrates the wall of concrete structure CS, frame drive unit 68 is actuated to traverse drilling machine 34 in an opposite direction along track 40 and longitudinal axis $L_1$-$L_1$ away from concrete structure CS and thereby remove the drill bit 78 from engagement with the concrete structure CS, optionally with either forward or reverse rotation of drill bit 78 as controlled by drive unit 74 of drill assembly 72. Of course, drill bit 80 may be used to drill one or more holes into a concrete structure CS on second turntable assembly 38b prior to the use of drill bit 78 for drilling one or more holes into a concrete structure CS on first turntable assembly 38a.

Thereafter, drilling machine 34 may be traversed along track 40 and longitudinal axis $L_1$-$L_1$ toward the second concrete structure CS to perform drilling operations on the second concrete structure CS in an analogous manner as described above with respect to the first concrete structure CS. Concurrent with traversing movement of drilling machine 34, the vertical positioning of turret assembly 66 and hence, the vertical position of shaft 76 and drill bits 78 and 80 may be adjusted to a desired vertical position as described above. Alternatively, drilling machine 34 may be traversed a slight distance away from the first concrete structure CS, followed by rotation of the turntable 44 of turntable assembly 38a to rotate first concrete structure CS, followed by drilling another hole at a desired vertical location in the first concrete structure CS.

Additionally, after drilling a first hole in first concrete structure CS, drilling machine 34 may be traversed along track 44 and longitudinal axis $L_1$-$L_1$ to perform a desired drilling operation with respect to second concrete structure CS while the turntable 44 of first turntable assembly 38a and first concrete structure CS are rotated to a desired position in which a subsequent hole may be drilled in the first concrete structure CS. Other variations on the foregoing operations may be apparent to one of ordinary skill in the art based on the teachings herein. In this manner, drilling machine 34 may be traversed with concurrent selected operation of turntable assemblies 38a and 38b to maximize the productivity of drilling multiple holes in each of concrete structures CS and CS.

Further, turntable assemblies 38a and 38b may be configured for transverse movement at an angle with respect to longitudinal axis $L_1$-$L_1$, such as perpendicular to longitudinal axis $L_1$-$L_1$, for example. Specifically In FIG. 3, turntable assembly 38a is configured for transverse, shifting movement by a drive mechanism along rails (not shown) along directions perpendicular to longitudinal axis $L_1$-$L_1$ so that a pair of side-by-side holes may be drilled in concrete structure CS at a selected height.

Figure 1:
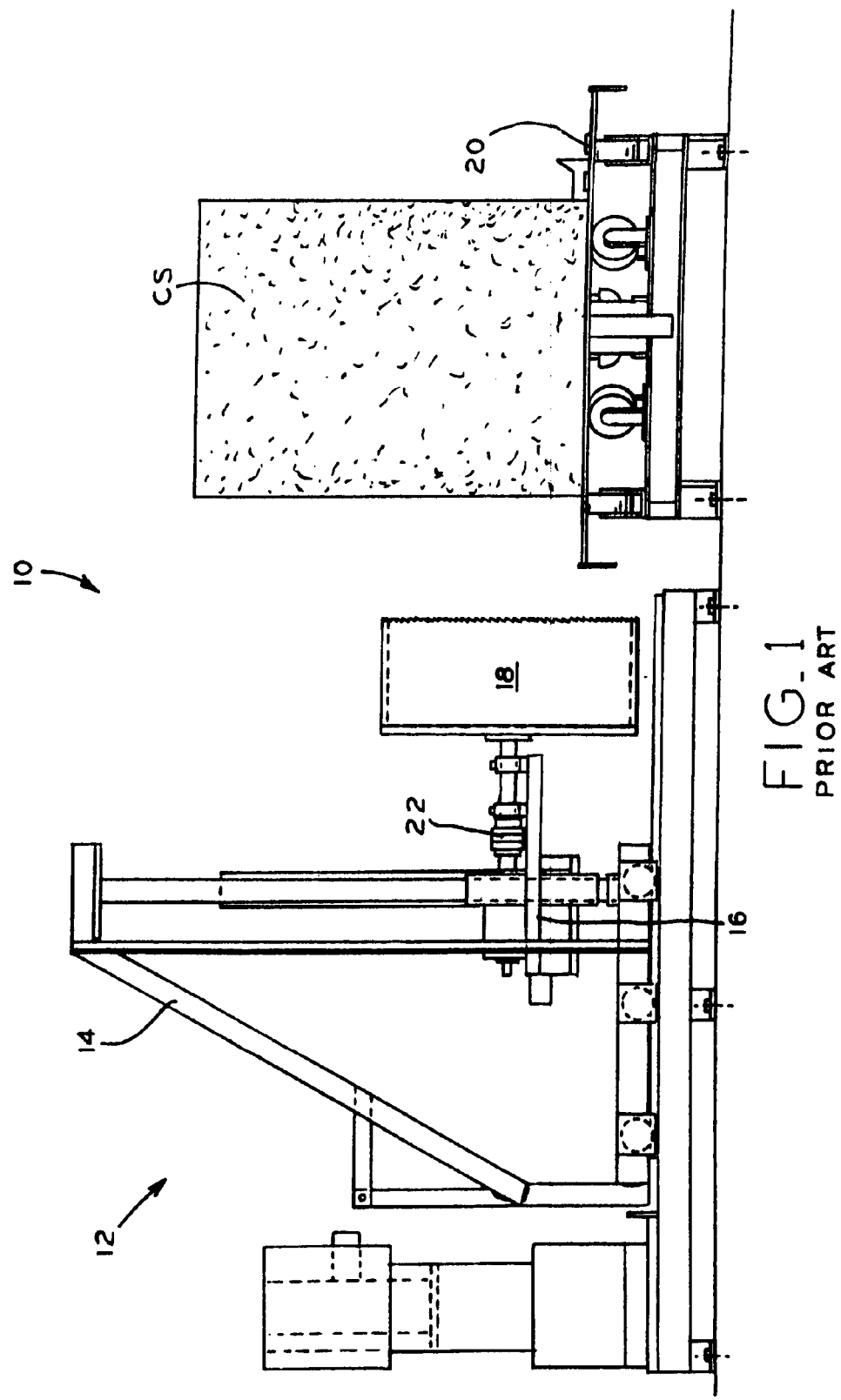
FIG. 1 is a side view of a first known drilling assembly.
Figure 2:
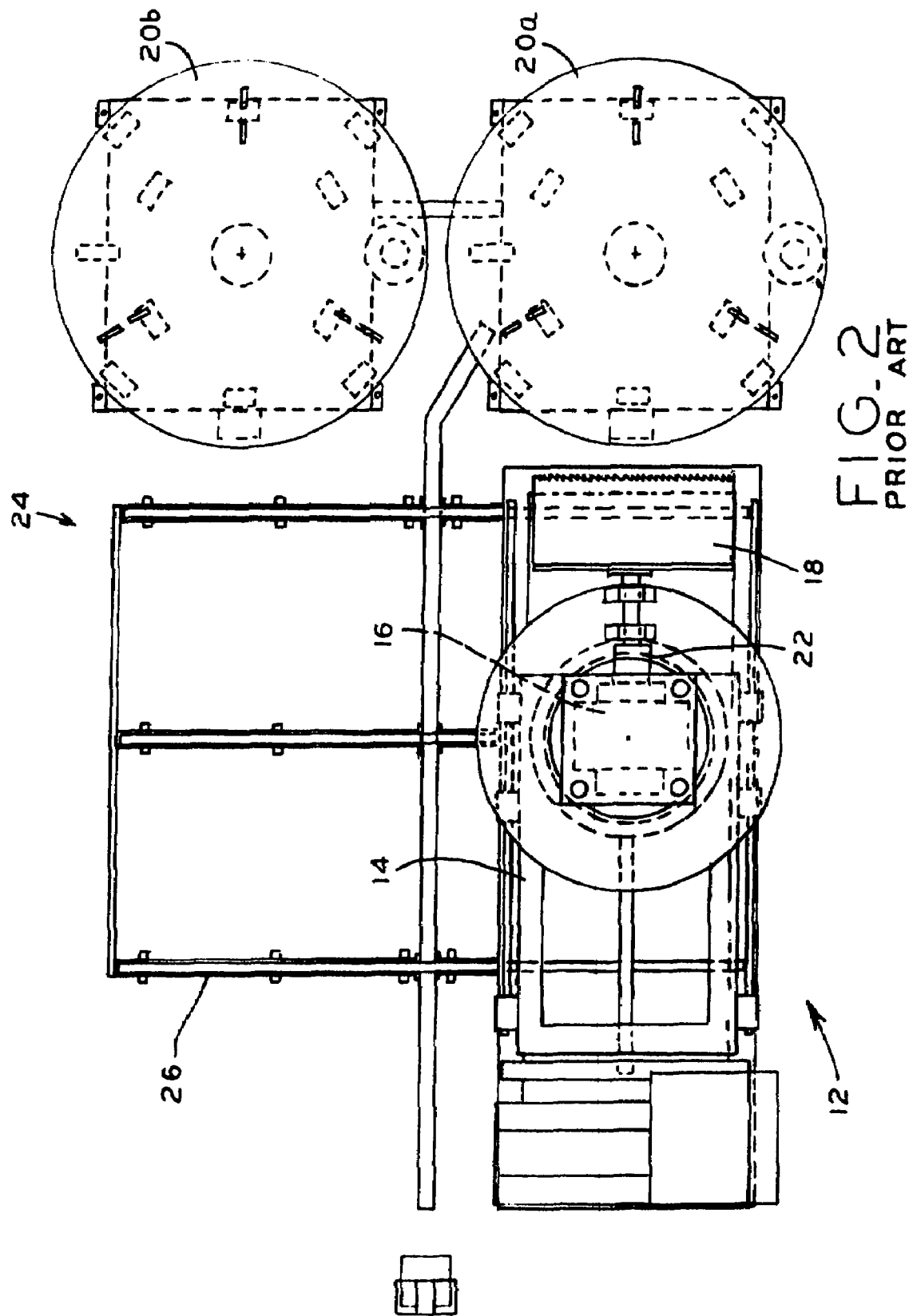
FIG. 2 is a top view of a second known drilling assembly.

Advantageously, the longitudinal axis $L_1$-$L_1$ along which drilling machine 34 traverses between turntable assemblies, and the axis along which drilling machine 34 drills with respect to any concrete structure CS on turntable assemblies 38a and 38b, is the same axis, such that traversing of drilling machine 34 and the drilling operations of drilling machine 34 both occur via the same mechanism along a common axis, as opposed to known drilling assemblies, such as that described above and shown in FIG. 2, in which the axis along which the drilling machine traverses is different from the axis along which the drilling machine drills. Additionally, because the traversing movement of drilling machine 34 and the drilling operations of drilling machine 34 occur via the same movement mechanism, namely, frame drive unit 68, the use of a separate, pneumatic drill drive as in known drilling machines is obviated in drilling machine 34.

Figure 7:
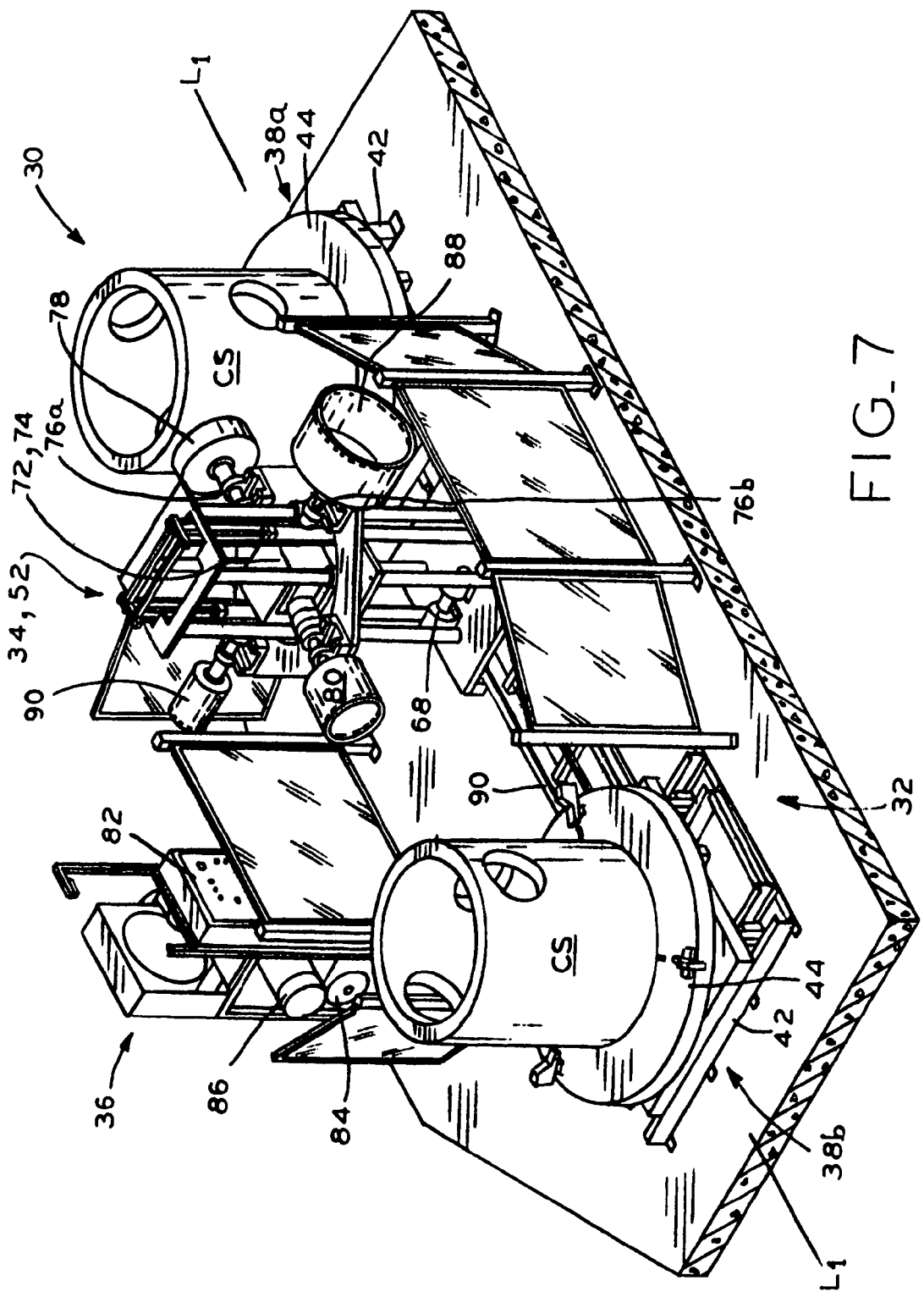
FIG. 7 is a perspective view of a drilling assembly according to a second embodiment of the present invention, showing a drilling machine including a drilling assembly rotatably mounted to the frame of the drilling machine to facilitate rapid exchanging of drill bits.

Referring to FIG. 7, a drilling machine 34 in accordance with another exemplary embodiment of the present invention includes upper plate 62 of turret assembly 66 rotatably mounted with respect to lower plate 64 in a suitable manner. Drill assembly 72 may include two or more separate shafts 76a and 76b to which drill bits 78, 80, 88, 90, of various sizes are mounted. Upper plate 62 of turret assembly 66 may be rotated manually or by a suitable drive mechanism (not shown) in order to align various drill bits along longitudinal axis $L_1$-$L_1$ such that the drill bits may be easily interchanged for drilling holes of various sizes in the concrete structures.

Figure 8:
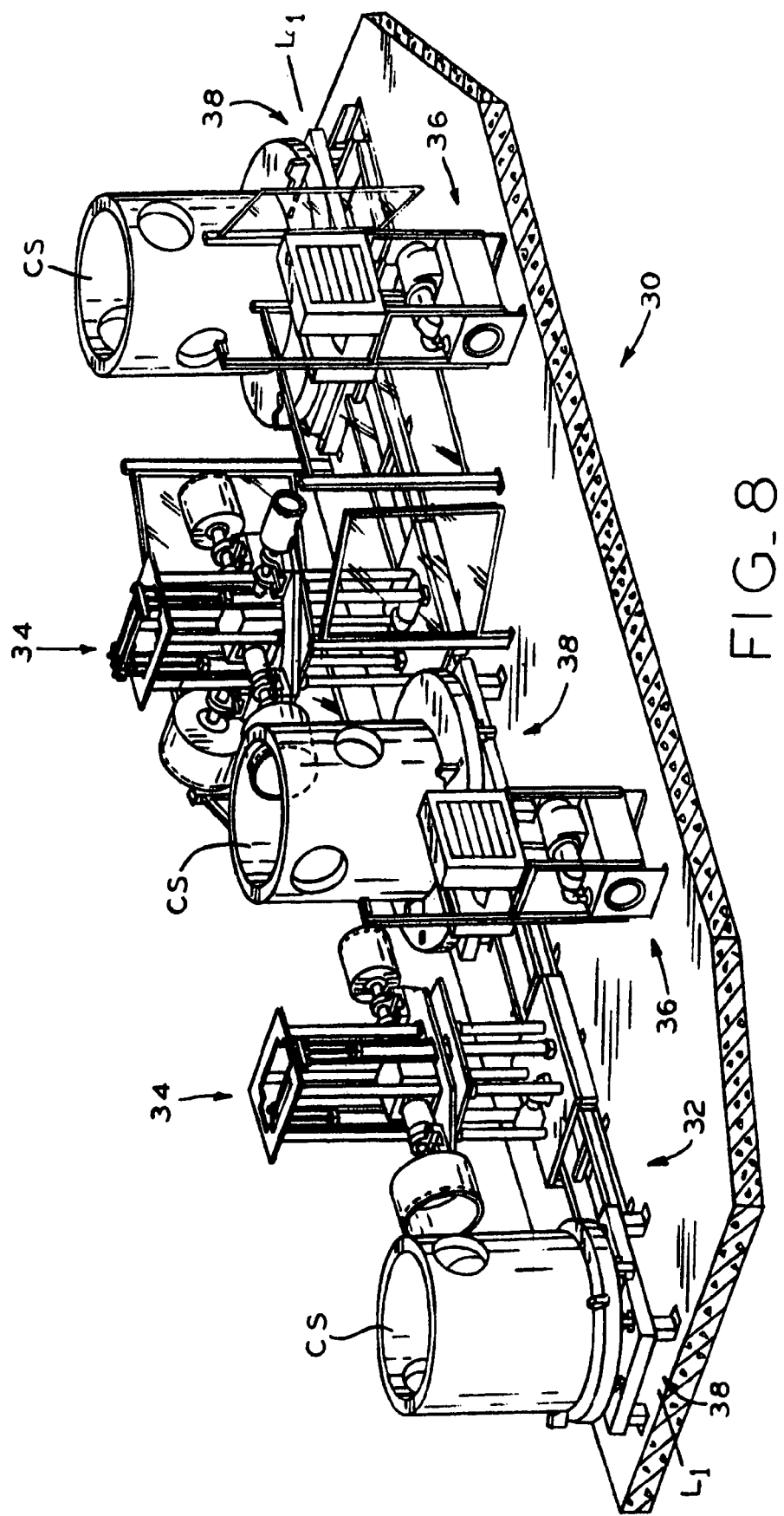
FIG. 8 is a perspective view of a drilling assembly according to a third embodiment of the present invention, including a pair of drilling machines disposed respectively between a set of three turntable assemblies.

A drilling assembly 30 is shown in FIG. 8 in accordance with another exemplary embodiment of the present invention, in which multiple turntable assemblies 38a, 38b, 38c are arranged with multiple drilling machines 34 along a common longitudinal axis $L_1$-$L_1$ to increase the productivity of drilling assembly 30. Other arrangements of turntable assemblies and drilling machines along one or more common longitudinal axes may be apparent to one of ordinary skill in the art based on the teachings herein.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drilling assembly for drilling holes in concrete structures, said drilling assembly comprising:
    a base assembly defining a longitudinal axis and adapted to support at least two concrete structures; and
    a drilling machine mounted with respect to said base assembly for movement along said longitudinal axis between a pair of locations on said base assembly on which the concrete structures are adapted to be supported, said drilling machine comprising:
        a frame;
        a drive unit;
        a drill assembly driven by said drive unit, said drill assembly including first and second drill bits facing in substantially opposite directions; and
        a turret assembly carrying said drill assembly, said turret assembly selectively movable to position said first and second drill bits in alignment with said longitudinal axis and out of alignment with said longitudinal axis.

2. A method of drilling holes in concrete structures, comprising the steps of:
    providing a drill assembly mounted on a track and disposed between first and second concrete structure supports, the track and the concrete structure supports disposed along a longitudinal axis;
    drilling a hole in a first concrete structure by moving a first drill bit of a drill assembly toward and away from the first concrete structure along a first axis;
    actuating a turret assembly of the drill assembly to move the first drill bit out of alignment with the first axis and a second drill bit into alignment with the first axis; and
    drilling a hole in a second concrete structure positioned on a side of the drill assembly opposite the first concrete structure by moving the second drill bit of the drill assembly toward and away from the second concrete structure along the first axis.

3. The drilling assembly of claim 1, wherein said base assembly includes a pair of turntables disposed substantially along said longitudinal axis, said turntables each adapted to rotatably support a concrete structure.

4. The drilling assembly of claim 1, wherein said base assembly includes a track substantially aligned with said longitudinal axis, said drilling machine movable along said track for drilling and traversing movement along said longitudinal axis.

5. The drilling assembly of claim 1, wherein said drilling machine includes at least a third drill bit, said turret assembly operable to move said third drill bit into and out of alignment with said longitudinal axis with concurrent movement of said first and second drill bits out of an into alignment with said longitudinal axis.

6. The drilling assembly of claim 1, wherein said drill assembly is vertically adjustably mounted with respect to said frame.

7. A drilling assembly for drilling holes in concrete structures, said drilling assembly comprising:
    a base assembly, comprising:
        first and second concrete structure supports spaced from one another and disposed along a longitudinal axis; and
        a track disposed between said first and second concrete structure supports and aligned along said longitudinal axis; and
    a drilling machine movable along said track and disposed between said first and second concrete structure supports, said drilling machine comprising:
        a frame; and
        a rotatable turret assembly including dual in-line drill bit means for alternately traversing and drilling in opposite directions along said longitudinal axis.

8. The drilling assembly of claim 7, wherein said concrete structure supports are rotatable turntables.

9. The drilling assembly of claim 7, wherein said dual in-line drill bit means includes at least one drill bit which is selectively movable into and out of alignment with said longitudinal axis.

10. The drilling assembly of claim 7, wherein said dual in-line drill bit means is vertically adjustably mounted with respect to said frame.

11. The method of claim 2, further comprising, after said first drilling step, the additional step of:
    traversing the drill assembly along the first axis away from the first concrete structure and toward the second concrete structure.

12. A drilling assembly for drilling holes in concrete structures, said drilling assembly comprising:
    a base assembly defining a longitudinal axis and adapted to support at least two concrete structures; and
    a drilling machine mounted with respect to said base assembly for movement along said longitudinal axis and disposed between a pair of locations on said base assembly on which the concrete structures are adapted to be supported, said drilling machine comprising:
a frame;
a drive unit and at least one drill bit rotatably driven by said drive unit; and
a rotatable turret assembly upon which said drive unit is mounted, said turret assembly rotatable with respect to said frame to move said drill bit between a first position in which said drill bit is aligned along said longitudinal axis facing in a first direction and a second position in which said drill bit is aligned along said longitudinal axis facing in a second direction opposite said first direction.

13. The drilling assembly of claim 12, wherein said base assembly includes a pair of turntables disposed substantially along said longitudinal axis, said turntables each adapted to rotatably support a concrete structure.

14. The drilling assembly of claim 12, wherein said base assembly includes a track substantially aligned with said longitudinal axis, said drilling machine movable along said track for drilling and traversing movement along said longitudinal axis.

15. The drilling assembly of claim 12, wherein said drill assembly is vertically adjustably mounted with respect to said frame.

16. The method of claim 2, further comprising, after said first drilling step, the additional step of:
rotating the concrete structure; and
drilling another hole in the first concrete structure by moving one of the first and second drill bits of the drill assembly toward and away from the first concrete structure along the first axis.

* * * * *

UNITED STATES PATENT AND TRADEMARK OFFICE
CERTIFICATE OF CORRECTION

PATENT NO. : 7,704,020 B1 Page 1 of 1
APPLICATION NO. : 11/860041
DATED : April 27, 2010
INVENTOR(S) : James M. Stengel It is certified that error appears in the above-identified patent and that said Letters Patent is hereby corrected as shown below:

In the Claims:
Claim 5, Column 8, Line 25, delete "an" and insert --and--

Signed and Sealed this

Tenth Day of August, 2010

David J. Kappos
*Director of the United States Patent and Trademark Office*